T. E. MURRAY.
GEAR WHEEL.
APPLICATION FILED JAN. 10, 1917.

1,220,775.

Patented Mar. 27, 1917.

Inventor
Thomas E. Murray
By his Attorney

UNITED STATES PATENT OFFICE.

THOMAS E. MURRAY, OF NEW YORK, N. Y.

GEAR-WHEEL.

1,220,775.  Specification of Letters Patent.  Patented Mar. 27, 1917.

Application filed January 10, 1917.  Serial No. 141,547.

*To all whom it may concern:*

Be it known that I, THOMAS E. MURRAY, a citizen of the United States, residing at New York, in the county of New York and State of New York, have invented a certain new and useful Improvement in Gear-Wheels, of which the following is a specification.

The invention relates to toothed gear wheels, and consists in the improved and cheapened construction hereinafter more particularly set forth.

In the accompanying drawings—

Figure 1:
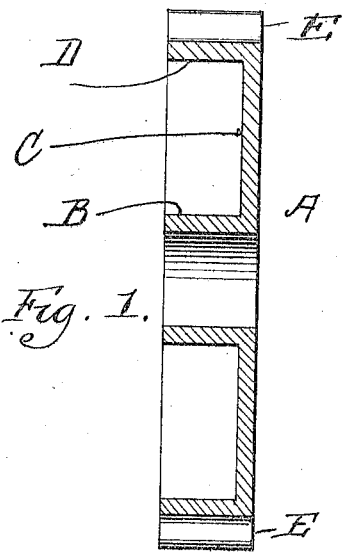
Figure 2:
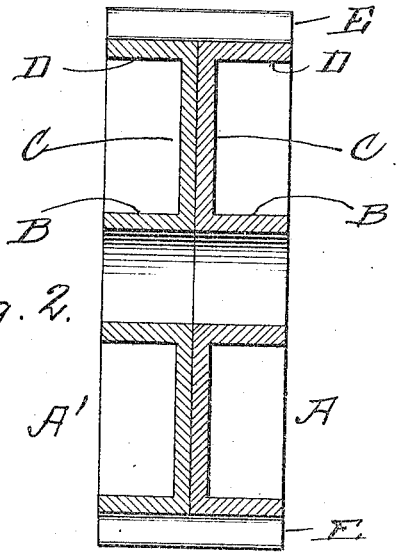
Figure 3:
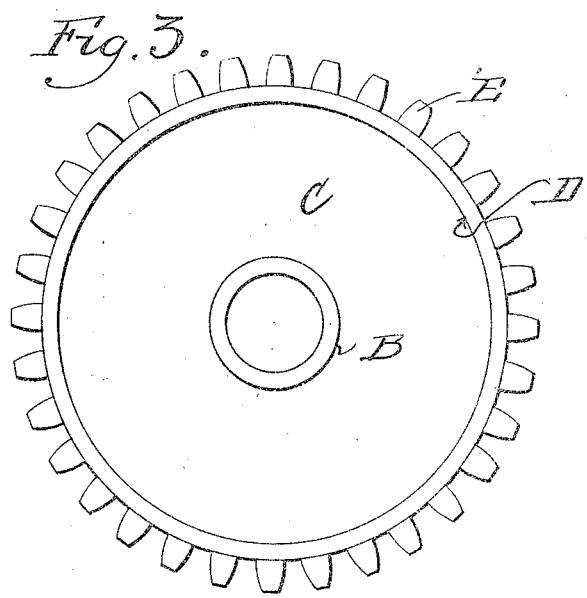

Figure 1 is a diametral section of my gear wheel. Fig. 2 is a similar section of a modified form thereof. Fig. 3 is a face view of said wheel.

Similar letters of reference indicate like parts.

The body portion A of the wheel includes a hub B, a web C and a rim D, these parts being integral and formed at one operation by striking up, pressing or stamping sheet metal, preferably a tough steel. The teeth E are all alike, and are formed separately in any suitable manner from hard steel. Said teeth are placed upon the rim D at a distance apart and are united thereto by welding—preferably electrical.

When it is desired to make the wheel of increased width at the rim, I may place together, back to back, two wheel bodies A, A', as shown in Fig. 2, and unite the same by welding. The length of the teeth in the form of wheel shown in Fig. 2 is, of course, to be increased to suit the increased width of the rim.

I find that this wheel is very cheaply and quickly made, and possesses abundant strength. It is especially suitable for automobile gears.

I claim:

1. A gear wheel having a body portion comprising integrally a hub, a rim and a web, the said parts being of struck up, pressed or stamped sheet metal, and teeth of relatively harder metal welded to said rim.

2. A gear wheel having a body portion in two parts, each comprising a hub, a rim and a web, the said parts each being of struck up, pressed or stamped sheet metal and welded together face to face, and teeth of relatively harder metal welded to said united rims.

3. A gear wheel having a body portion comprising integrally a hub, a rim and a web, the said parts being of struck up, pressed or stamped sheet metal, an annular disk concentric with said body portion, of like diameter and welded to the face thereof, and teeth of metal relatively harder than the metal of said body portion and disk welded to said rim and to the circumferential edge of said disk.

In testimony whereof I have affixed my signature in presence of two witnesses.

THOMAS E. MURRAY.

Witnesses:
GERTRUDE T. PORTER,
MAY T. MCGARRY.